(12) United States Patent
Burström et al.

(10) Patent No.: US 7,441,183 B2
(45) Date of Patent: Oct. 21, 2008

(54) METHOD COMPUTER PROGRAM PRODUCT AND DEVICE FOR ARRANGING COORDINATE AREAS RELATIVE TO EACH OTHER

(75) Inventors: Stefan Burström, Lund (SE); Jan B. Andersson, Waltham, MA (US)

(73) Assignee: Anoto AB, Lund (SE)

( * ) Notice: Subject to any disclaimer, the term of this patent is extended or adjusted under 35 U.S.C. 154(b) by 1050 days.

(21) Appl. No.: 10/488,877

(22) PCT Filed: Sep. 10, 2002

(86) PCT No.: PCT/SE02/01618

§ 371 (c)(1),
(2), (4) Date: May 27, 2004

(87) PCT Pub. No.: WO03/023595

PCT Pub. Date: Mar. 20, 2003

(65) Prior Publication Data

US 2004/0236741 A1    Nov. 25, 2004

(30) Foreign Application Priority Data

Sep. 10, 2001    (SE) .................................... 0102984

(51) Int. Cl.
*G06F 17/00*    (2006.01)
(52) U.S. Cl. ..................... 715/230; 345/179; 382/313; 382/314; 715/211
(58) Field of Classification Search ................. 715/200, 715/203, 208, 211, 230; 345/179; 382/313, 382/314
See application file for complete search history.

(56) References Cited

U.S. PATENT DOCUMENTS 5,477,012 A    12/1995    Sekendur (Continued)

FOREIGN PATENT DOCUMENTS

WO    WO 99/50787 A1    10/1999

(Continued)

OTHER PUBLICATIONS

Mackay, W. E., Pothier, G., Letondal, C., Bøegh, K., and Sørensen, H. E. 2002. The missing link: augmenting biology laboratory notebooks. In Proceedings of the 15th Annual ACM Symposium on User interface Software and Technology (Paris, France, Oct. 27-30, 2002). UIST '02. ACM, New York, NY, 41-50.*

(Continued)

*Primary Examiner*—Doug Hutton
*Assistant Examiner*—James H Blackwell
(74) *Attorney, Agent, or Firm*—Birch, Stewart, Kolasch & Birch, LLP

(57) ABSTRACT

The invention relates to a method, a computer program product and a device for arranging a first and a second coordinate area relative to each other, which first and second coordinate areas are coded on a first and a second surface by a position-coding pattern. The method comprises the steps of receiving an electronic representation of a continuous line that has been drawn over the surfaces while the position-coding pattern on these was recorded, and creating an association between the first and second coordinate areas, based on a direction in which the line was drawn over a discontinuity in the Position-coding pattern, a first association being created if the line was drawn in a first direction and a second association being created if the line was drawn in a second direction.

20 Claims, 14 Drawing Sheets

U.S. PATENT DOCUMENTS

| | | | |
|---|---|---|---|
| 5,661,506 | A | 8/1997 | Lazzouni et al. |
| 5,852,434 | A | 12/1998 | Sekendur |
| 6,345,304 | B1 * | 2/2002 | Dymetman et al. ......... 709/238 |
| 6,570,104 | B1 | 5/2003 | Ericson et al. |
| 6,663,008 | B1 | 12/2003 | Pettersson et al. |
| 6,665,490 | B2 * | 12/2003 | Copperman et al. ........... 386/95 |
| 6,674,427 | B1 | 1/2004 | Pettersson et al. |
| 6,720,985 | B1 * | 4/2004 | Silverbrook et al. ........ 715/863 |
| 2002/0011989 | A1 * | 1/2002 | Ericson et al. .............. 345/158 |
| 2002/0091711 | A1 | 7/2002 | Ericson |
| 2003/0046256 | A1 | 3/2003 | Hugosson et al. |
| 2003/0061188 | A1 | 3/2003 | Wiebe et al. |

FOREIGN PATENT DOCUMENTS

| | | |
|---|---|---|
| WO | WO 01/16691 A1 | 3/2001 |
| WO | WO 01/22208 A1 | 3/2001 |
| WO | WO 01/61453 A2 | 8/2001 |
| WO | WO 01/75781 A1 | 10/2001 |

OTHER PUBLICATIONS

Wellner, P. 1993. Interacting with paper on the DigitalDesk. Commun. ACM 36, 7 (Jul. 1993), 87-96.*

Hinckley, K., Ramos, G., Guimbretiere, F., Baudisch, P., and Smith, M. 2004. Stitching: pen gestures that span multiple displays. In Proceedings of the Working Conference on Advanced Visual interfaces (Gallipoli, Italy, May 25-28, 2004). AVI '04. ACM, New York, NY, 23-31.*

Norrie, M. C. and Signer, B. 2003. Switching Over to Paper: A New Web Channel. In Proceedings of the Fourth international Conference on Web information Systems Engineering (Dec. 10-12, 2003). WISE. IEEE Computer Society, Washington, DC, 209.*

Liao, C., Guimbretière, F., and Loeckenhoff, C. E. 2006. Pen-top feedback for paper-based interfaces. In Proceedings of the 19th Annual ACM Symposium on User interface Software and Technology (Montreux, Switzerland, Oct. 15-18, 2006). UIST '06. ACM, New York, NY, 201-210.*

Guimbretière, F. 2003. Paper augmented digital documents. In Proceedings of the 16th Annual ACM Symposium on User interface Software and Technology (Vancouver, Canada, Nov. 2-5, 2003). UIST '03. ACM Sumposium on User interface and Software and Technology (Montreux, Switzerland, Oct. 15-18, 2006). UIST '06. ACM, New York, NY, 51-60.*

Arai, T., Aust, D., and Hudson, S. E. 1997. PaperLink: a technique for hyperlinking from real paper to electronic content. In Proceedings of the SIGCHI Conference on Human Factors in Computing Systems (Atlanta, Georgia, United States, Mar. 22-27, 1997). S. Pemberton, Ed. CHI '97 . ACM, New York, NY, 327-334.*

Liao, C., Guimbretière, F., and Hinckley, K. 2005. PapierCraft: a command system for interactive paper. In Proceedings of the 18th Annual ACM Symposium on User interface Software and Technology (Seattle, WA, USA, Oct. 23-26, 2005), UIST '05. ACM, New York, NY, 241-244.*

XP002328425: Dymetman, Marc and Cooperman, Max, "Intelligent Paper" *Xerox Research Centre Europe*, pp. 392-406, (1998).

\* cited by examiner

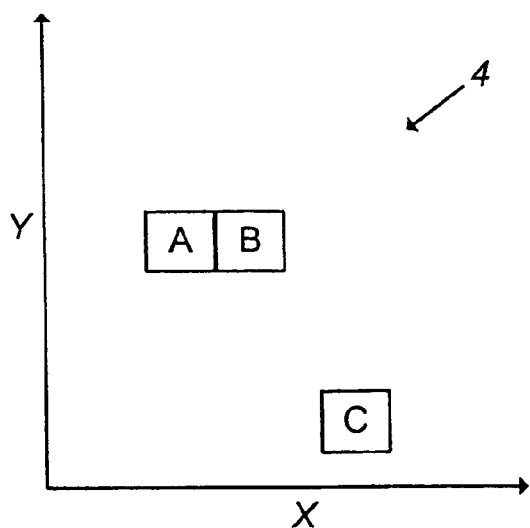
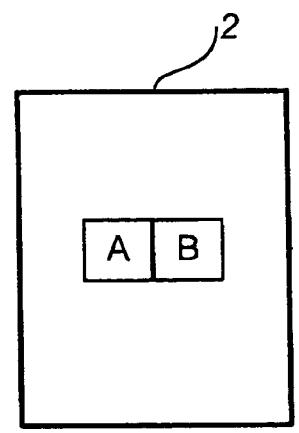
Fig 4a  Fig 4b
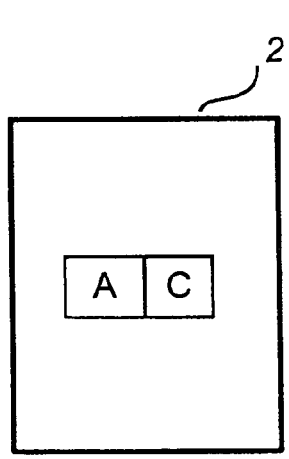
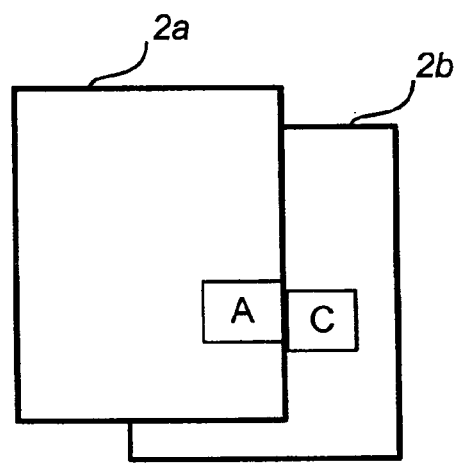
Fig 4c  Fig 4d

METHOD COMPUTER PROGRAM PRODUCT AND DEVICE FOR ARRANGING COORDINATE AREAS RELATIVE TO EACH OTHER

TECHNICAL FIELD

The present invention relates to a method, a computer program product and a device for arranging a first and a second coordinate area relative to each other.

BACKGROUND TO THE INVENTION

Various methods are available for entering information into a computer, or for "digitizing" information. Such methods comprise handling a keyboard, voice recognition, image scanning, use of the various forms of pointing devices and recently also handwriting recognition, as is used in many PDAs (PDA—personal digital assistant, pocket computer).

The entered information can then be stored in the user's computer or on a server that is available via a computer network, in order at a later date to be edited, transferred to other users, published or printed out. With the increased spread and availability of the Internet, it is increasingly becoming possible to access electronically-stored information, irrespective of where the user is located. New mobile telephone networks make possible, for example, wireless access to the Internet. As increasing amounts of information become available in electronic form, and as physical information, that is information on paper, becomes to an increasing extent a reflection of the electronic information, new needs will arise for being able to interact with the electronically-stored information.

When entering data using any of the above methods, it can be desirable to link together various electronically-available data sets, such as two electronic documents or an electronic document and a meeting entry in an electronic calendar. It could also be desirable to be able to arrange the data sets in structures or hierarchies, in order to sort them or in order to be able to leaf through them in a structured way using, for example, a web-browser.

An object of the present invention is to provide a method, a computer program product and a device that enable a user to arrange a plurality of such documents or data sets in a simple way.

SUMMARY OF THE INVENTION

The above object is achieved wholly or partially by a method, a computer program product and a device as described herein.

In one aspect, the invention is a method for arranging a first and a second coordinate area relative to each other, which first and second coordinate areas are coded on a first and a second surface by a position-coding pattern, the method comprising the steps of receiving an electronic representation of a continuous line that has been drawn over the surfaces while the position-coding pattern on these was recorded, and creating an association between said first and second coordinate areas, based on a direction in which the line was drawn over a discontinuity in the position-coding pattern, a first association being created if the line was drawn in a first direction and a second association being created if the line was drawn in a second direction. By means of this method, associations between coordinate areas can be created in a way that is simple and intuitive for the user. The associations can then be utilized in many different ways, for example for sorting or connecting data sets related with coordinate areas. By using the direction in which the line was drawn, the user can control the direction of the association or the relationship between the coordinate areas. It is also possible to associate additional data sets with coordinate areas after the association has been created. Precisely how the direction of the line controls the relationship between the coordinate areas can be determined by the software that utilizes or interprets the association.

An electronic representation of a physical continuous line can be a series of pairs of coordinates, a series of images, an image or some other machine-readable representation of a line known to those skilled in the art. A discontinuity can, for example, be caused by a jump in the position-coding pattern by means of which the physical line is transformed_to electronic form. Such a jump can occur when the physical line is drawn across spatially separated subsets of the position-coding pattern.

The method described above can be applied either in a user device or in a data processing unit. In addition, it can be implemented in real time as pairs of coordinates are recorded or at a suitable time based on a representation of the line.

In another aspect, the invention is a computer program product comprising a program for arranging a first and a second electronically-stored data set relative to each other. When executed, the program carries out the method according to the invention. The computer program product can comprise a suitable storage medium and can be executed either in the user device or in a data processing unit.

In yet another aspect, the invention is a device for arranging a first and a second coordinate area relative to each other, which first and second coordinate areas are coded on a first and a second surface by a position-coding pattern. The device has means for receiving an electronic representation of a continuous line that has been drawn over the surfaces while the position-coding pattern on these was recorded, and means for creating an association between said first and second coordinate areas, based on a direction in which the line was drawn over a discontinuity in the position-coding pattern, a first association being created if the line was drawn in a first direction and a second association being created if the line was drawn in a second direction.

The device according to the invention can be a user device or a data processing unit, as described below.

The invention will be described in more detail below, with reference to the accompanying schematic drawings which, for the purpose of exemplification, show currently preferred embodiments of the invention, according to its different aspects.

BRIEF DESCRIPTION OF THE DRAWINGS

FIG. 4 shows schematically the placing of areas from an imaginary surface (FIG. 4a) on bases (FIGS. 4b, 4c, 4d).

DESCRIPTION OF PREFERRED EMBODIMENTS

Figure 1:
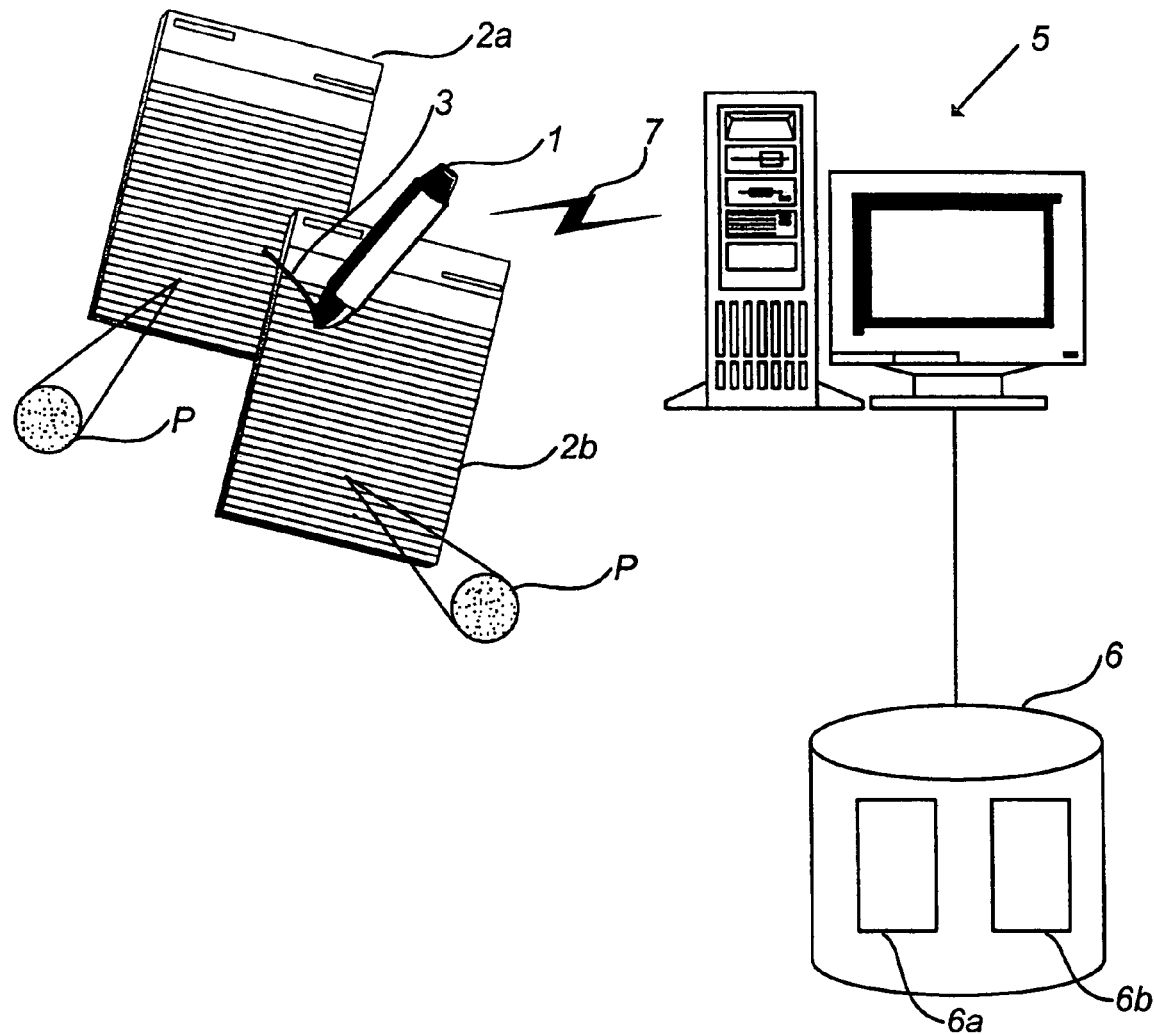
FIG. 1 shows schematically the components of a system in which the present invention can be used.

FIG. 1 shows schematically components with which the invention can be realized. These comprise two or more bases, also called "surfaces", 2a, 2b, which are provided with a position-coding pattern P, a reading pen or user device 1 that can record the position-coding pattern at the same time as graphic marks are being made on the base. In addition, there are one or more storage units 6 for storing electronic representations of information on the bases and a data processing unit 5 for processing data stored by the storage unit and for communication with the user device. The storage unit 6 is shown in the accompanying drawings as only one storage unit, but can of course consist of several storage units located in different places. In the same way, the data processing unit 5 can be several data processing units, with the same or different functions. In addition, the data processing unit and the storage unit can be integrated into one unit.

The position-coding pattern on the surfaces can be recorded using the user device 1, whereby coordinates for positions or points on a surface can be calculated. The coordinates can be analyzed in the user device and/or sent via a communication network, as discussed below, to the storage unit or the data processing unit in order to be analyzed or stored there, or for the execution of services in response to the coordinates recorded based on the position-coding pattern.

Figure 2:
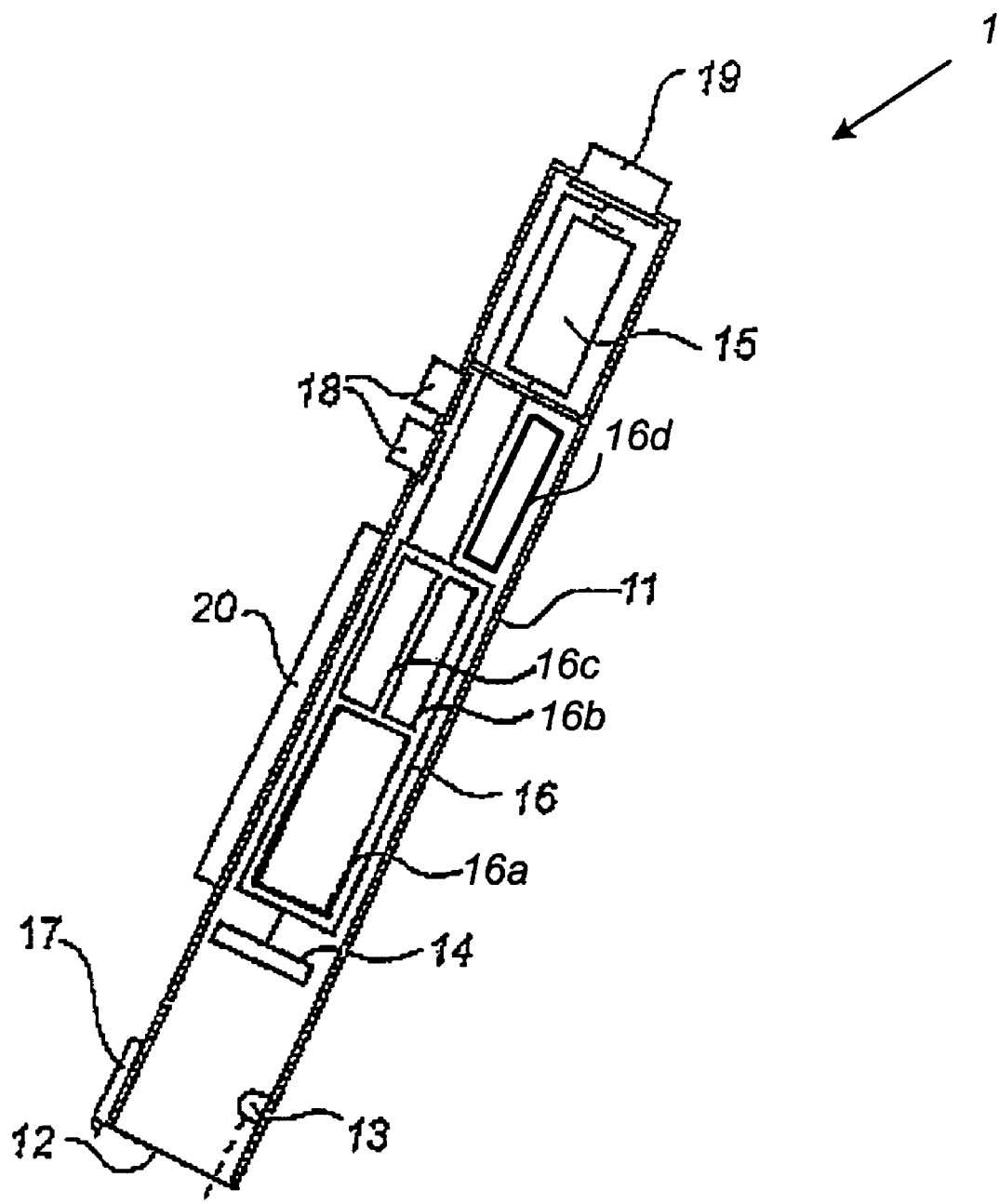
FIG. 2 shows schematically a user device which can be used in the system in FIG. 1.

FIG. 2 shows a schematic example of a user device that is suitable for use in connection with the present invention. This user device 1 can be of the type described in U.S. Pat. No. 6,674,427.

The user device 1 comprises a casing 11 which is approximately the same shape as a pen. In the short side of the casing, there is an opening 12. The short side is intended to abut against or to be held a short distance from the surface or the base on which the recording of the position-coding pattern for the position determination is to be carried out.

The casing contains essentially an optics part, an electronic circuitry part and a power supply.

The optics part comprises at least one light-emitting diode 13 for illuminating the surface which is to be imaged and a light-sensitive area sensor 14, for example a CCD or CMOS sensor, for recording a two-dimensional image. Optionally, the device can also contain an optical system, such as a mirror and/or lens system. The light-emitting diode can be an infrared light-emitting diode and the sensor can be sensitive to infrared light.

The power supply for the device is obtained from a battery 15, which is mounted in a separate compartment in the casing. It is also possible to provide the power supply via a cable from an external power source (not shown).

The electronic circuitry part contains a signal processor 16 which comprises a processor 16a with a working memory 16b and a program memory 16c. In addition, the device comprises a storage memory 16d for storing, for example, coordinate data. The processor 16a is programmed to read images from the sensor, to detect the position-coding pattern in the images and to decode this into positions in the form of pairs of coordinates, and to process the information thus recorded in electronic form in the way that is described in greater detail below.

In this embodiment, the device also comprises a pen point 17, by means of which ordinary pigment-based writing can be written on the surface on which the position determination is to be carried out. The pen point 17 can be extendable and retractable so that the user can control whether or not it is to be used. In certain applications the device does not need to have a pen point at all.

The pigment-based writing is suitably of such a type that it is transparent to infrared light and the position-coding pattern suitably absorbs infrared light. By using a light-emitting diode which emits infrared light and a sensor which is sensitive to infrared light, the detection of the pattern is carried out without the above-mentioned writing interfering with the pattern. The light-emitting diode and the sensor is triggered synchronously by the signal processor 16, suitably at a fixed frequency, typically about 50-100 Hz.

In addition, the device can comprise buttons 18, by means of which the device can be activated and controlled. It can also have a transceiver 19 for wireless transmission, for example using infrared light, radio waves or ultrasound, of information to and from the device. The device can also comprise a display 20 for displaying positions or recorded information.

The device can be divided between different physical casings, a first casing containing components which are required for recording images of the position-coding pattern and for transmitting these to components which are contained in a second casing and which carry out the position determination on the basis of the recorded image(s).

Figure 3:
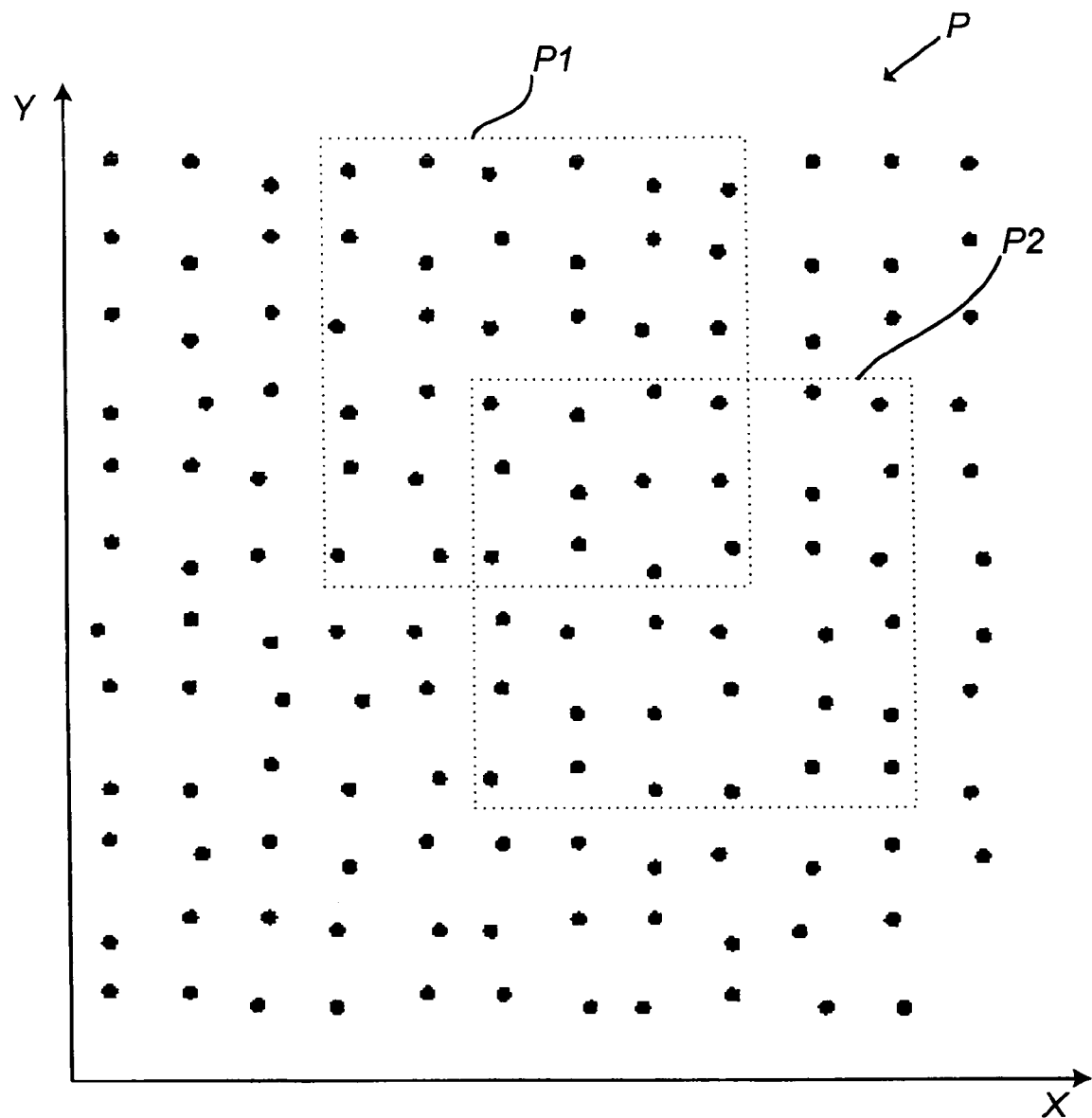
FIG. 3 shows schematically a position-coding pattern which can be used in connection with the system in FIG. 1.

FIG. 3 shows a schematic example of a position-coding pattern P that can be used in connection with the present invention and that can be arranged, for example, on the bases 2a and 2b. In the other accompanying drawings, the position-coding pattern P is shown only schematically, as a surface provided with dots.

This position-coding pattern is used to record in electronic form what is written on the base. Different types of position-coding pattern, that can be used for this purpose, are previously known. For example, U.S. Pat. No. 5,477,012 shows a position-coding pattern where each position is coded by a unique symbol. The position-coding pattern can be read off using a pen, which detects the position code optically, decodes this and generates pairs of coordinates which describe the movement of the pen across the surface. In U.S. Pat. Nos. 6,570,104 and 6,663,008, which are incorporated herein by reference and are both assigned to the Applicant of the present application, another position-coding pattern is described, where each position is coded using a plurality of symbols of a simpler type and where each symbol contributes to the coding of more than one position. In U.S. Pat. No. 6,570,104, different sized dots are used to code ones and zeros in the position-coding pattern, which is binary. In U.S. Pat. No. 6,663,008, four different displacements of a dot from a nominal position are used to code four different bit pairs in the position-coding pattern. A certain number of dots, for example 6*6 dots, P1, P2, codes a unique position. The position can be calculated from the bit values corresponding to the dots.

The position-coding patterns in U.S. Pat. Nos. 6,570,104 and 6,663,008 can be detected optically using a pen that decodes the dots and generates a pair of coordinates for each set of, for example, 6*6 dots. If the position-coding pattern is read off while the pen is writing on the position-coding pattern, a sequence or series of pairs of coordinates is thus obtained, which sequence or series describes the movement of the pen across the position-coding pattern and thus constitutes an electronic representation of what is being written on the base.

In the following, it is assumed that the base $2a$ and $2b$ is provided with a position-coding pattern of the type that is described in, for example, U.S. Pat. No. 6,663,008.

The position-coding pattern in U.S. Pat. No. 6,663,008 can code coordinates for a very large number of points or positions. These points can together be said to form an imaginary surface, that is a "virtual" or "theoretical" surface, which can be described using coordinates, but which does not actually exist in the physical sense of the word. FIG. $4a$ shows schematically such an imaginary surface 4, on which three areas A, B and C have been marked.

The imaginary surface can be divided into smaller areas by pairs of coordinates that represent the limits of each such area being stored in, for example, a database. On the imaginary surface in FIG. $4a$, the three areas A, B and C are delimited by pairs of coordinates that represent the corner points of the respective areas.

By means of a position-coding pattern as described above, such coordinates can be coded in machine-readable form. By recording the position-coding pattern at a point, the coordinates of the point on the imaginary surface can be calculated.

By arranging the position-coding pattern on a base 2, for example a sheet of paper, coordinates can be coded on the base 2 for points on the imaginary surface 4. If an area on the imaginary surface is coded by a position-coding pattern arranged on a base, which position-coding pattern is reserved for precisely that base, it can be said that the area has been "cut out" from the imaginary surface and placed on the base 2. This is described in greater detail in for example U.S. Publication Nos. 2003/0061188, 2003/0046256, and 2002/0091711, which are incorporated herein by reference. The imaginary surface can be divided into areas and subareas by the areas being specified in a database and therein linked with, for example, functions or owners. When an area is allocated to a function or an owner, it can be reserved so that it cannot at the same time be allocated to other functions or owners. A list of reserved areas can be made available, for example via the Internet.

FIG. $4b$ shows a first example of this, where the areas A and B from the imaginary surface 4 in FIG. 4 have been "cut out" and arranged next to each other on a base 2, by the coordinate areas that code corresponding areas on the imaginary surface being arranged on the base.

FIG. $4c$ shows how the areas A and C have been "cut out" from the imaginary surface 4 and arranged next to each other on a base 2, in the same way as in FIG. $4b$.

FIG. $4d$ shows how the cut-out areas A and C are arranged on different bases $2a$, $2b$ and how the bases are then brought together in order that a line can be drawn across the areas A and C, whereby recording of the position-coding pattern can be carried out using the user device.

FIGS. $4b$ and $4c$ thus show bases each with two coordinate areas, A, B and A, C respectively.

A function can be associated with each area. The coordinates, for example coordinates of two diagonally opposite corner points of the respective area, are then stored in a data base, so that, given a pair of coordinates in the database, it is possible to locate the area to which the pair of coordinates belongs. In this database respective areas can then be linked with, for example, addresses to which data that is marked in an area is to be sent, applications, functions or other areas that are associated with or linked to the area.

It is also possible to define in the database subscribers, license-holders or owners of areas, so that information that is marked in a particular area can be linked to or sent to a predetermined unit. An example of entries in such a database is shown in Table 1.

TABLE 1

Example of entries in a database containing n areas.

| Area | Belongs to | Function |
| --- | --- | --- |
| $X_1, Y_1; X_2, Y_2$ | Company 1 | Send.to (111.11.11.1) |
| $X_3, Y_3; X_4, Y_4$ | Company 2 | Send.to (222.22.22.2) |
| . | . | . |
| . | . | . |
| . | . | . |
| $X_{n-1}, Y_{n-1}; X_n, Y_n$ | Company n | Send.to (nnn.nn.nn.n) |

When, for example, a pair of coordinates in an area according to the second row in Table 1 is recorded by the user device or is received in a server, the data that was entered in the area in question or on the base in question can be sent to an IP address (in the example according to Table 1: 111.11.11.1), that belongs to Company 1, for further processing.

A database as described above can be found both in the pen 1, for the functions that the pen 1 is to recognize directly, or in the storage unit 6 or in association with the data processing unit 5, for the functions that can be carried out from there. As coordinates that code the respective areas are arranged on bases, as shown in FIGS. $4b$ and $4c$, the areas that are associated with functions or network addresses can be defined on the bases. When pairs of coordinates within an area are recorded by a user device 1, this can cause a function to be executed in the user device or in some unit with which the user device 1 communicates.

Each area consists in the respective dimension (x,y) of a quantity of sequential pairs of coordinates, for which reason a line that was drawn and recorded within an area (for example the area A+B in FIG. $4b$) using the user device will comprise a series of pairs of coordinates. By a line is meant here a graphic mark that was made by a user device on a base without raising the user device from the base. The fact that the user device has been raised from the base can be detected, for example, by the pen point of the user device being connected to a pressure sensor, or by the distance to the position-coding pattern being measured optically.

A line that is continuous on a physical surface can be interpreted in several different ways, in addition to as an ordinary graphic line. By physically continuous is meant that the line has been made with one stroke of the user device. The electronic representation of the line can, however, be continuous or discontinuous depending upon the position-coding pattern on the base on which the line was recorded. By the electronic representation of the line being continuous is meant that the distance on the imaginary surface between pairs of coordinates for two points recorded directly after each other is less than a certain predetermined distance value. A physically continuous line can thus be discontinuous if, when it is recorded in electronic form, it contains pairs of coordinates from at least two different, spatially separate areas of the position-coding pattern.

If a line is thus drawn and recorded across two areas (for example the areas A and C in FIG. $4c$), which are not adjacent to each other on the imaginary surface, the electronically recorded line will contain a discontinuity. A discontinuity can, for example, be detected when the distance on the imaginary surface between two points recorded directly after each other is larger than said predetermined distance value. The predetermined distance value can be selected depending upon which type of area is being recorded. An electronically recorded line comprising such a discontinuity is in the following called a "hyperline".

Discontinuities can arise either as a result of two areas of the position-coding pattern having been arranged on the same base (FIG. 4c) or when two bases on which different areas of the position-coding pattern are arranged (FIG. 4d) are brought together so that a line can be drawn across them.

The hyperline can be given a signification that relates to a relationship between the different areas across which the line is drawn. This signification can be to connect logically or "associate" the areas with each other, so that for example one data set associated with a first area is associated with a data set that belongs to a second area. Such an association can be stored in different ways in a storage unit and thereby utilized by applications that have access to the storage unit.

The signification can, as discussed below, be dependent upon the direction of the drawn line, so that for example a note page and a business card are associated with each other in a way that is dependent upon the direction in which the line was drawn. The associations can be handled in the same way as the above-mentioned associations of areas with owners and functions, as described in connection with Table 1 above. This will be discussed in greater detail below.

FIG. 1 shows two bases 2a, 2b, which are wholly or partially provided with a position-coding pattern P. The bases are preferably connected to information which has been digitized and is stored and accessible in electronic form 6a, 6b. The information may be connected to the base 2a, 2b by a user writing it down on an area that is provided with a position-coding pattern P, and/or by it being created electronically and printed on the base 2a, 2b. The bases may also be connected to additional electronic information which is not written or printed thereon. The electronic form of the information can be stored as electronic documents such as .pdf (Adobe Acrobat®), .doc (MS Word®), .svf (standard vector format) or other formats, but it is also possible to store the information as some form of raw data such as a series of points, coordinates or vectors which represents information that was written down on the base using a user device. More or less processed versions of such raw data, such as text files from OCR software, can also be stored and utilized.

The storage can, for example, be in a personal computer, a PDA, a mobile telephone or simply in the actual user device. A server comprising a data processing unit 5 and a storage unit 6 can also be used. Different electronic documents 6a, 6b can also be stored in different storage units 6, even though this is not shown in FIG. 1.

In addition, a communication means 7 can be arranged between the user device 1 and the storage unit 6. This communication means 7 can, for example, be a computer, a mobile telephone, a mobile telephone network, a telephone network, a computer network or a combination of these. Precisely how the communication means operates is of subordinate significance, as its function is to make possible the transmission of data from the user device to the storage unit, in a way known to those skilled in the art. It is also possible to connect the user device directly to a computer network via cable, short-range radio link, infrared link, mobile telephone network or in some other suitable way.

Optionally, the storage unit 6 can also be connected to a data processing unit 5, such as a personal computer or some other suitable device equipped with a processor. The data processing unit 5 can be arranged to read electronic documents 6a, 6b stored in the storage unit and can be provided with software for analyzing the documents or the files, and for taking measures based on the result of such analyses. The data processing unit 5 can also act as an intermediary between the storage unit 6 and the communication means 7, and can also communicate directly with the user device 1 and other units. In this way, the data processing unit 5 can receive, analyze and convert information going to and from the user device 1.

FIG. 5, like FIG. 1, shows a first embodiment of the invention, where two bases 2a, 2b are utilized, which contain information that is also stored in electronic form 6a, 6b in a storage unit 6 and which are provided with a position-coding pattern P. The information can, as described above, be preprinted on the base 2a, 2b or written down by the user. When this was carried out is less important, provided that the information is stored and available in electronic form in the storage unit 6.

FIGS. 5-10 show a broken line that schematically separates the physical aspects of the invention (use of the user device and the base) from its logical aspects (processing in the data processing unit/storage unit).

The user now wants to create a reference 3a from a first document 2a to a second document 2b, so that when the user or some other person reads the corresponding first electronic document 6a via his/her computer, it will automatically contain a reference 3a to the corresponding second electronic document 6b.

According to the invention, the user places both the bases 2a, 2b next to or overlapping each other. The user draws a line 3 with his user device 1 from the first base 2a, across the transition between the bases and a little way onto the second base 2b.

When the user passes the user device across the bases, the user device 1 records a series of pairs of coordinates, which corresponds to the line 3. The pairs of coordinates are usually stored as raw data in a memory in the user device and are not sent to the storage unit/data processing unit 6/5 until the user device 1 has recorded an area that indicates that sending is to be initiated.

In the transition between the bases 2a, 2b, the user device 1 records, however, a discontinuity, since a recorded pair of coordinates does not belong to the same area as the preceding pair of coordinates. When the discontinuity is recorded, the user device 1 first investigates whether any one of the areas belongs to a predetermined function area, for example a "send" area. If such is the case, this function can be carried out, for example, sending the data that is stored in the storage memory 16d of the user device (FIG. 2). If none of the areas is a function area, the hyperline 3 can instead be recorded as an association 3a, that is an association between the areas, as described above. The association can be stored in the storage memory of the user device and can comprise references to the areas between which the line 3 was drawn. As an alternative, the series of pairs of coordinates can be stored precisely as the other pairs of coordinates, to be analyzed later in the data processing unit 5, whereby detection of the discontinuity is carried out in the data processing unit.

When the user then marks an area that has a "send" function, the pairs of coordinates stored in the memory are sent, along with any associations, via the computer network 7 to the storage unit 6. Optionally, only data that is associated with the "send" function, the surface in question or some recorded association can be sent.

When the pairs of coordinates are sent to the storage unit 6, they can either be stored as they are for later processing, or can be processed immediately by the data processing unit 5.

Such processing can comprise interpretation of recorded data by for example OCR or ICR. The processing can also comprise conversion to other storage formats, such as text document, graphics files, forms, spreadsheets or database entries. The processing can also comprise analysis and storage of recorded associations 3a.

As shown in FIG. 5, the associations 3a recorded by the user device 1 can be analyzed with regard to which areas the line has been drawn across. For example, a "to" area and a "from" area can be determined, based on the time sequence or order in which the coordinates were recorded on the respective side of the discontinuity.

Figure 5A:
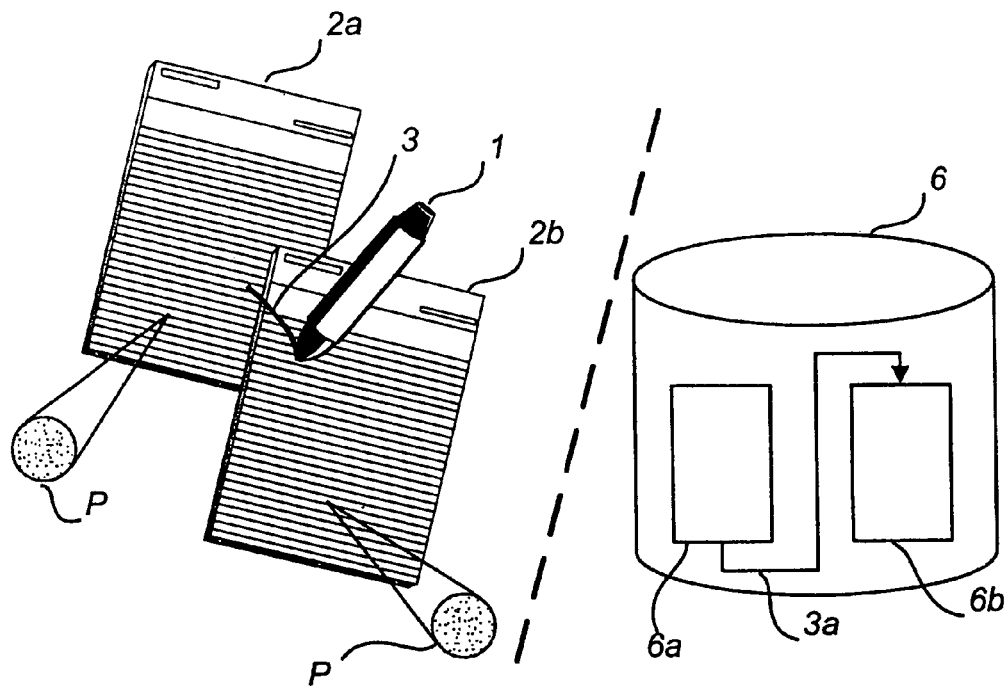
FIG. 5 shows schematically an aspect according to a first embodiment of the present invention.
Figure 5B:
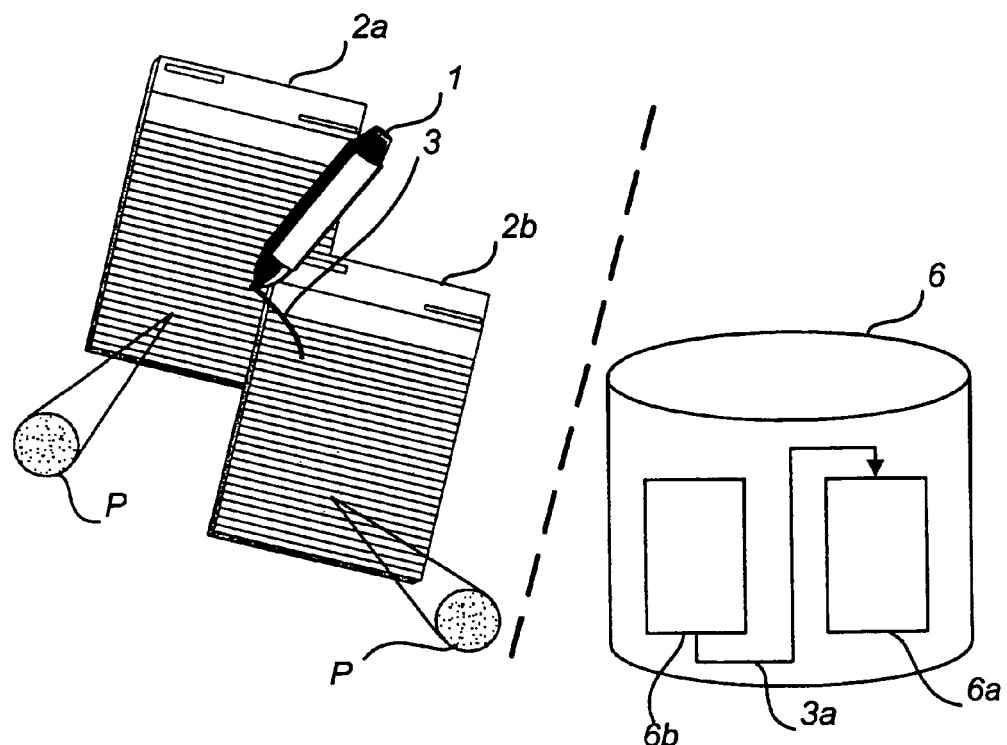

FIGS. 5a and 5b show how an association between two bases 2a and 2b can differ depending upon the direction in which the line 3 was drawn with the user device 1. In FIG. 5a, the base 2a was recorded before the base 2b. The association can thus be that the electronic document 6a refers to the electronic document 6b. In FIG. 5b, on the other hand, the base 2b was recorded before the base 2a, for which reason the association can be that the electronic document 6b refers to the electronic document 6a.

The associations can be stored in the storage unit 6. The storage of the association 3a can be carried out in various ways. According to a possible embodiment, associations are stored in a database in the form of relationships between areas, as shown in Table 2 below. In Table 2, Area 1 can, for example, be defined as a "from" area and Area 2 as a "to" area, where the "from" area can be the area that was recorded first when the line was drawn and the "to" area can be the area that was recorded last when the line was drawn. This information can, for example, be utilized in such a way that Area 1 refers to Area 2, without Area 2 necessarily referring to Area 1. It is, of course, also possible to invert the definition of "from" area and "to" area, so that Area 2 refers to Area 1. Which area is defined as the "to" area and the "from" area can also be application-specific, that is can depend on the software that receives, utilizes and/or interprets the association.

TABLE 2

Example of database of associations.

| Area 1 | Area 2 |
|---|---|
| $X_1, Y_1; X_2, Y_2$ | $X_3, Y_3; X_4, Y_4$ |
| $X_5, Y_5; X_6, Y_6$ | $X_7, Y_7; X_8, Y_8$ |
| . | . |
| . | . |
| . | . |
| $X_{n-3}, Y_{n-3}; X_{n-2}, Y_{n-2}$ | $X_{n-1}, Y_{n-1}; X_n, Y_n$ |

It is also possible to store associations in other forms than the sets of coordinates shown in Table 2, for example as document name, page number or other designations designed for the specific areas. It is also possible to divide the imaginary surface into subareas with, for example, a similar function, use or owner. In this way, precise pairs of coordinates do not necessarily need to be stated in the association database in Table 2 in order for an association to be able to work, but only a sufficiently large part of the pairs of coordinates to enable the area to be identified with sufficient accuracy for the application in question. The associations can also be converted to designations that refer directly to the electronic documents that are associated, for example hyperlinks or search paths in a storage unit or in a computer network. The storage of the associations can be carried out in electronic form in a storage medium suitable for the purpose.

Figure 6:
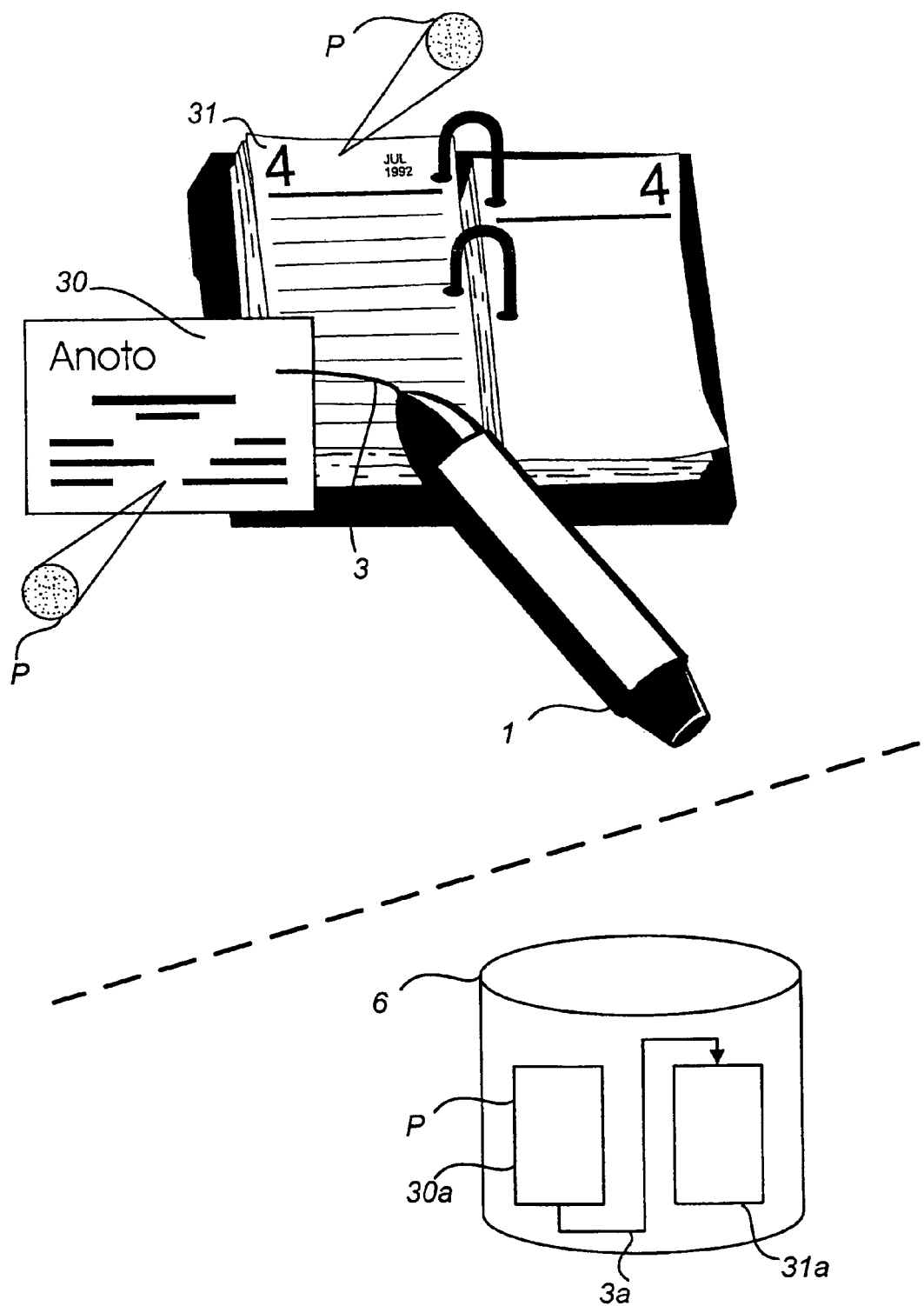
FIG. 6 shows schematically a second embodiment of the present invention.

FIG. 6 shows a second embodiment of the present invention, in which a business card 30 and a calendar 31 are associated with each other. As in the first embodiment, it is assumed here that the business card 30 and the calendar 31 are provided with a position-coding pattern P. Similarly, electronic equivalents 30a, 31a of the business card and the calendar respectively are stored and available.

The business card 30 and the calendar 31 or the calendar page are placed in such a way that a line 3 can be drawn from one to the other. The association 3a that is hereby created can be made to depend on the order in which the business card 30 and the calendar page 31 were recorded.

If the position-coding pattern P on the business card 30 was recorded first and then the position-coding pattern on the calendar page 31, this can mean that the information on the business card 30 is entered onto the calendar 31 and/or that a meeting is arranged with the owner of the business card.

If, on the other hand, the calendar page 31 is recorded before the business card 30, this can be interpreted that a message is to be sent to the owner of the business card, which message can include an invitation to a meeting. Optionally, the time and date of the meeting can be determined by where the line starts or ends on the calendar page 31.

Figure 7:
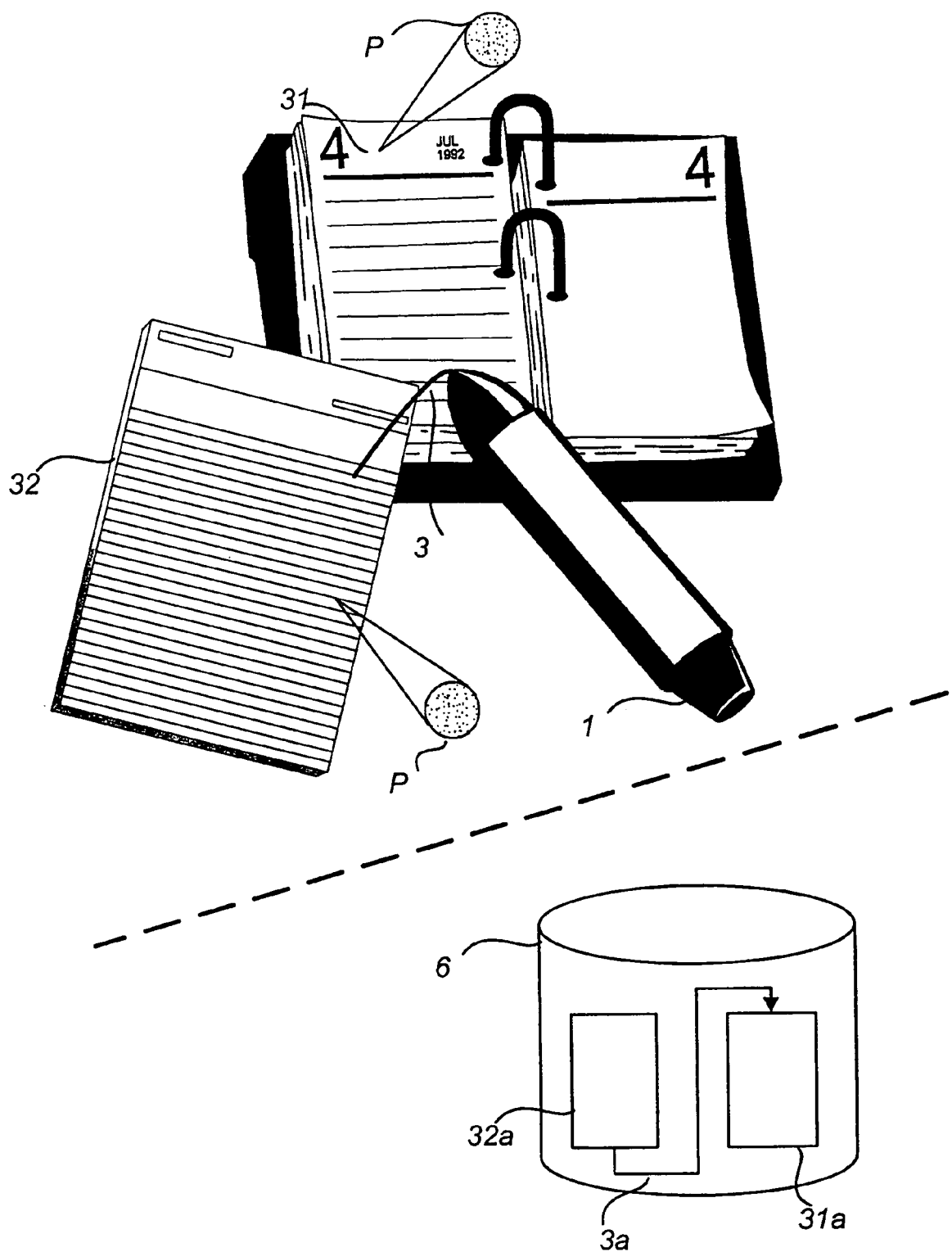
FIG. 7 shows schematically a third embodiment of the present invention.

FIG. 7 shows a third embodiment of the present invention, where a base 32 with notes is associated with a calendar page 31. Depending upon the direction in which the line 3 is drawn that associates the bases with each other, different effects can be achieved.

If, for example, the base with notes 32 is recorded first, this can mean that the notes are associated with a particular meeting or a particular calendar time. On the basis of this association 3a, a meeting entry in, for example, Microsoft Outlook® can be created or modified so that the notes 32a are attached to the meeting entry 31a.

If instead the calendar page 31 is recorded first, this can mean that the content of this, such as notes, date or the like, is transferred to the notes 32a, or that the note page 32a is dated according to the calendar page 31a. It can also mean that data from the calendar page 31a, such as time, place and participants in a meeting, is transferred to the notes 32a.

Figure 8:
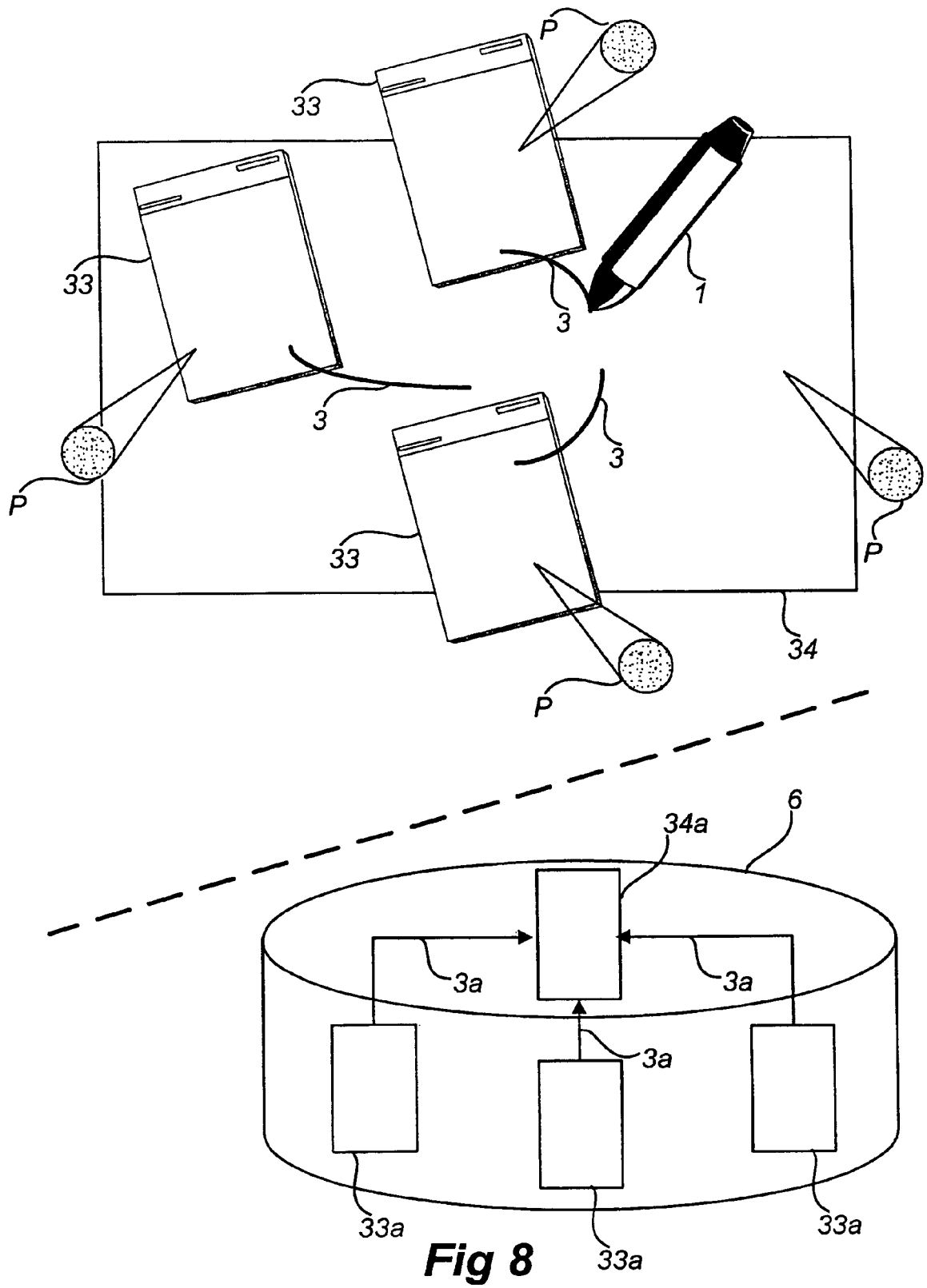
FIG. 8 shows schematically a fourth embodiment of the present invention.

FIG. 8 shows a fourth embodiment, in which a surface 34, for example a desktop, a refrigerator or a notice board, is provided with a position-coding pattern P and a number of bases 33 containing information are placed on the surface. The bases 33 are also provided with position-coding patterns. By drawing hyperlines 3 from the respective bases 33 to the physical surface 34, electronic equivalents of the content on the bases 33a are associated with an electronic version 34a of the physical surface 34, for example the "Desktop" in Windows®.

If instead the physical surface 34 is a refrigerator, memo notes 33 that are stuck on the refrigerator can, for example, be associated with an electronic version of the refrigerator surface and can be stored there for transmission to, for example, a calendar, a "to-do" list, a shopping list or an electronic message.

Figure 9:
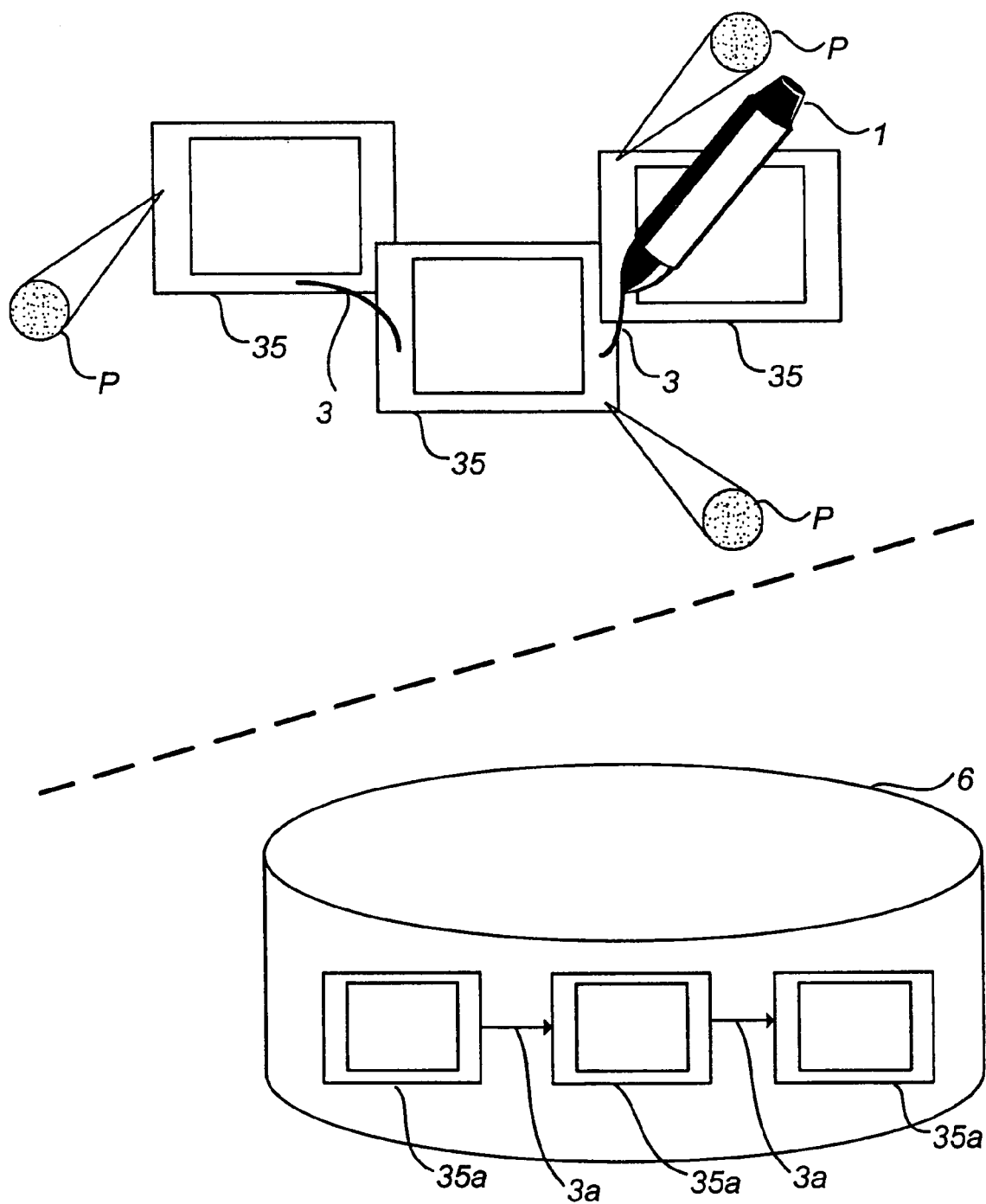
FIG. 9 shows schematically a fifth embodiment of the present invention.

FIG. 9 shows a fifth embodiment of the present invention, in which a sequence order between a number of bases 35 is recorded. The bases are provided with a position-coding pattern and can be print-outs of, for example, pages in a book, photographs in an album or OHP slides for a presentation.

The user arranges the images in the sequence order in which he/she wants them and then draws lines 3 between pairs of bases 35, or across all the bases in a single line. By recording the direction of the lines 3, the bases are associated with each other and a sequence order can be distinguished, after which the electronically-stored equivalents 35a of the bases can be sorted and displayed.

Figure 10:
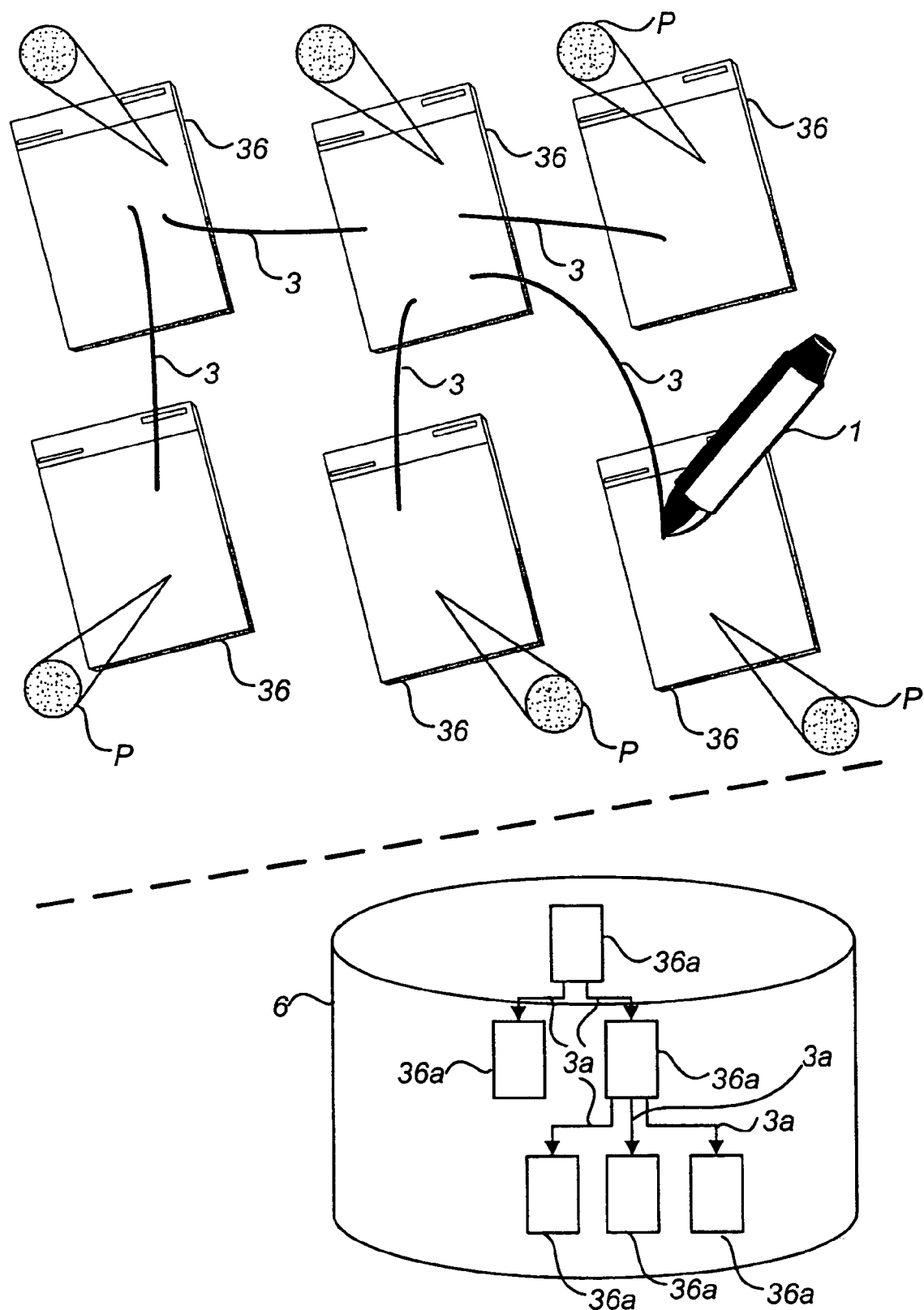
FIG. 10 shows schematically a sixth embodiment of the present invention.

FIG. 10 shows an extension of the embodiment that was described in connection with FIG. 3, where documents 36 are associated with each other by means of lines 3 that indicate references from one document 36 to another 36. By recording the direction of the lines 3 that are drawn from document to document, it is possible to determine how the documents 36, 36a relate to each other, so that a hierarchy can be created. For example, this can be used to create a structure of electronic documents 36a, where, using print-outs of the documents 36, references are created between them by placing the documents on a surface and then drawing lines 3 between them in the order that is required. The references can advantageously be incorporated in the electronic documents in the form of hyperlinks, but they can also be stored as described above, in the form of database entries. It is also possible to utilize associations to create literature references to other documents.

Figure 11:
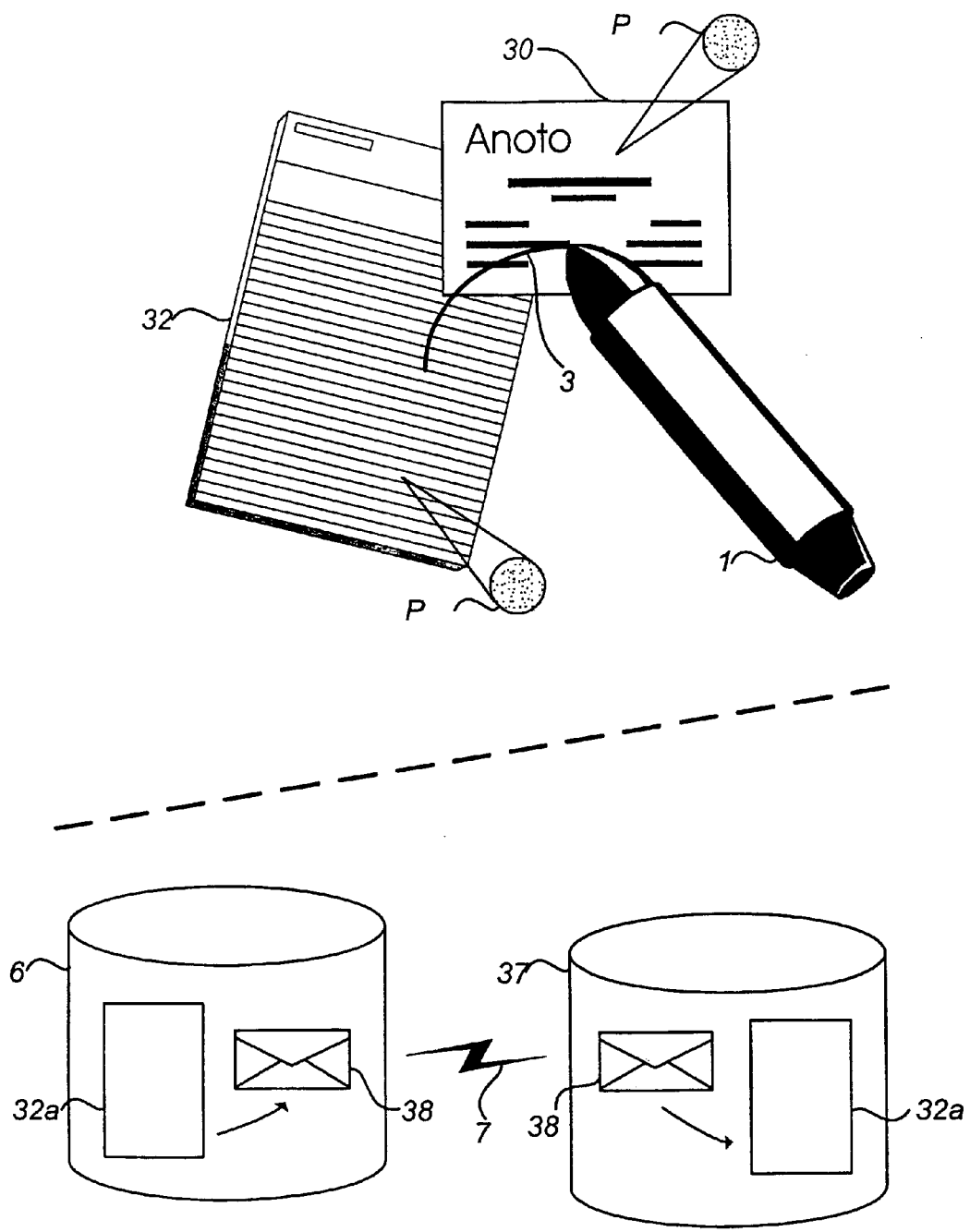
FIG. 11 shows schematically a seventh embodiment of the present invention.

FIG. 11 shows an embodiment of the invention in which notes that were written down on a base 32 and recorded in electronic form 32a are sent as an e-mail message 38, by a line 3 being drawn from the base 32 with the notes to a business card 30 that is provided with a position-coding pattern, and are sent to the owner of the business card as, for example, an e-mail or fax message. The e-mail message is received at a second storage unit 37 where it may be accessed by the recipient, i.e. the owner of the business card. This can be made possible by information corresponding to the business card being stored in a storage unit 6. When the line is drawn from the base 32 to the business card, an association is created between the base 32 and the business card 30.

By the line 3 being drawn instead from the business card 30 to the base 32 with the notes, a second function can be initiated, for example information from the business card being added to the notes.

Figure 12:
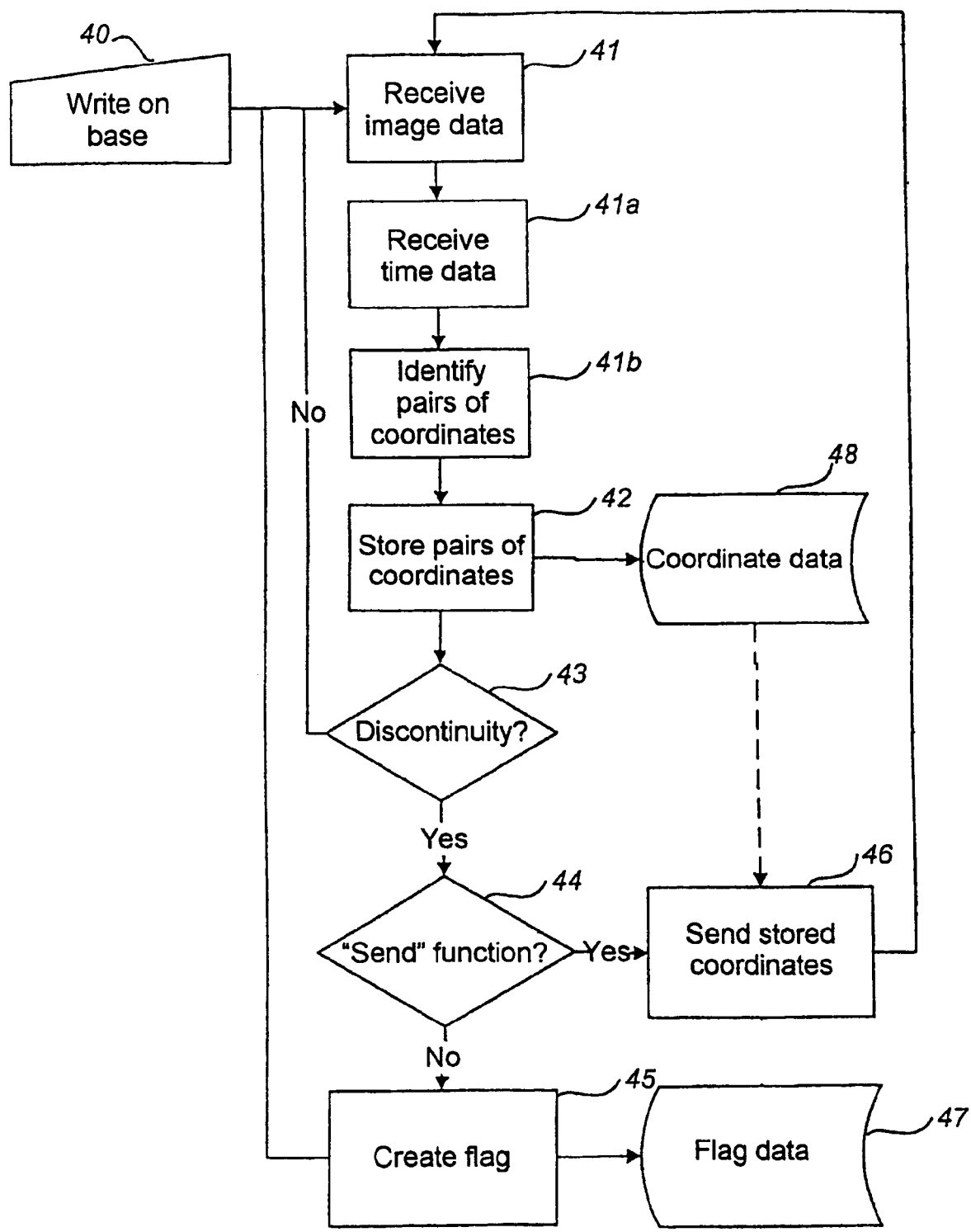
FIG. 12 shows a schematic flow chart according to a first aspect of the present invention.

FIG. 12 shows a flow chart for the entry of data into the pen 1. When the user device is passed in a line across a base in step 40, it receives image data in step 41 in the form of a series of images that represents the position-coding pattern on the base. In addition, in step 41a, time data is received, that indicates when the respective images in the series were taken. The time resolution of the time data is matched advantageously to the interval between the images, for example $\frac{1}{50}$ or $\frac{1}{100}$ of a second. In this connection, the time data can be related to the order in which pairs of coordinates are recorded, rather than the actual times at which the recording is carried out. The image data is analyzed in order to calculate, in step 41b, pairs of coordinates for points on the line on the basis of the position-coding pattern. The processing of image data and time data can be carried out in real time, for example so that a pair of coordinates is calculated for each image, as soon as this has been recorded. The flow chart in FIG. 12 can thus be interpreted in such a way that the step 41 of receiving image data means that an image is received and that the step 41b of identifying pairs of coordinates means calculating a pair of coordinates in the image, etc. The calculated pairs of coordinates form a series of pairs of coordinates, which can constitute an electronic representation of the line. FIG. 12 can, however, also be interpreted in such a way that a complete sequence of image data is received in step 41. This method can be utilized when the identification does not need to be carried out in real time, such as in the data processing unit 5. The interpretation of FIG. 12 can thus be governed by whether the method is to be implemented in a user device 1 or in a data processing unit 5.

In step 42, the pairs of coordinates are stored in a storage memory 16d, 48. The stored pairs of coordinates can be provided with time stamps, that give the precise time at which each pair of coordinates was recorded. As the pairs of coordinates are recorded, an analysis of them can be carried out, whereby discontinuities are detected in step 43. When a discontinuity is detected, this can be analyzed in order to determine in step 44 whether the discontinuity leads to an area with a pre-determined function, such as for example a "send" area. If such is the case, the stored pairs of coordinates associated with the "send" function are sent in step 46 to a storage unit/data processing unit for further processing. If the discontinuity does not lead to a function area, the user device can create a flag in step 45 that indicates the discontinuity. Such a flag can have various forms and, in step 47, can advantageously be stored in the user device's memory 16b, 16c or in the storage memory 16d to be sent later to the data processing unit 5 or the storage unit 6. The flag can in practice be interpreted by the data processing unit as an association between the indicated coordinate areas. For example, the flag can contain "from" area and "to" area in some suitable form, or it can contain pairs of coordinates for the respective sides of the discontinuity and time stamps for the respective pairs of coordinates. It is also possible to store the discontinuity in step 47 in the form of a hyperlink or as a combination of the above. As mentioned above, the step of creating a flag is not necessary, as the series of pairs of coordinates can be analyzed afterwards instead. The storage of data in the user device or in the storage unit 6 can advantageously be preceded by compression in a way known to those skilled in the art.

Figure 13:
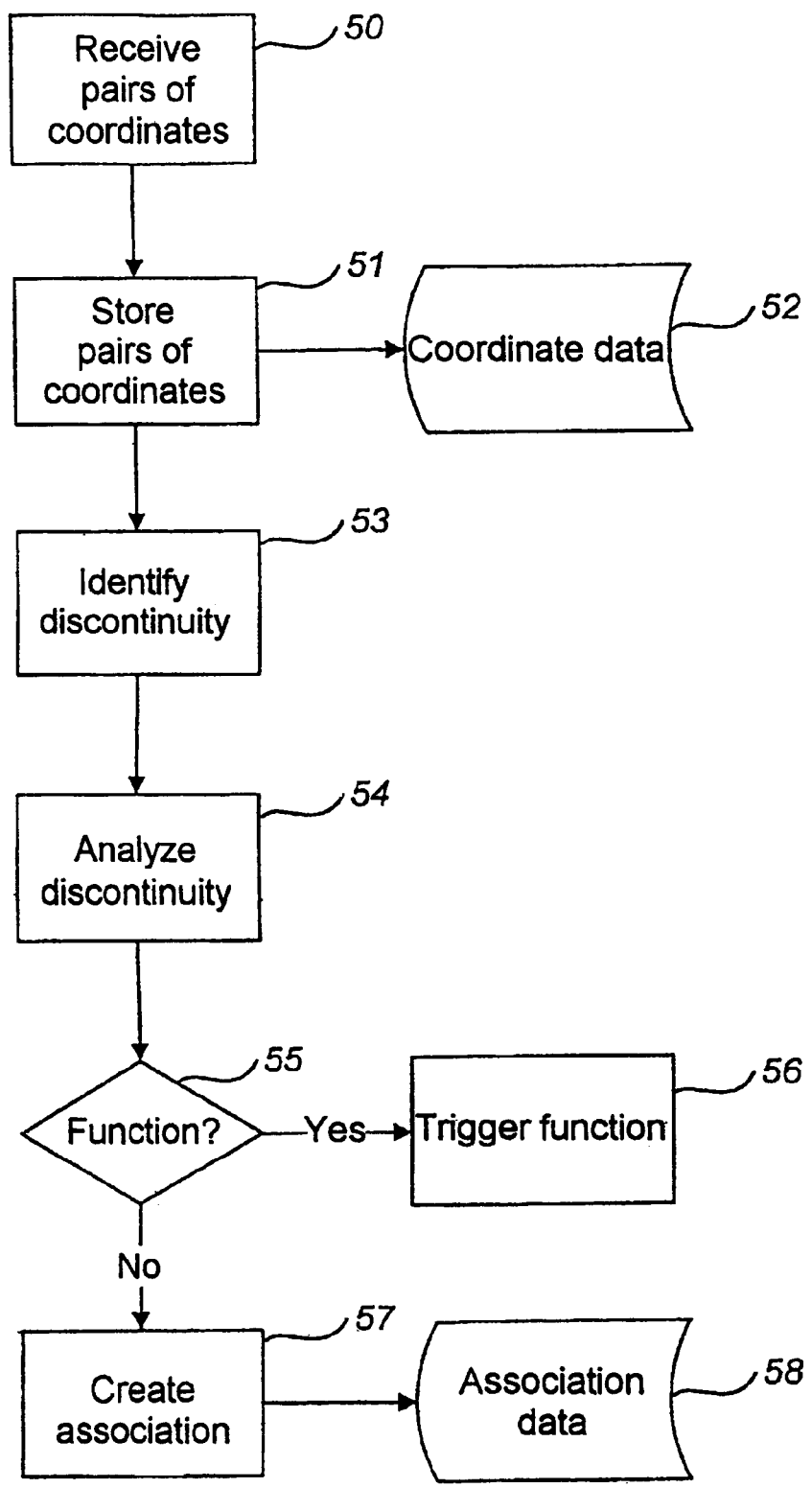
FIG. 13 shows a schematic flow chart according to a second aspect of the present invention.

FIG. 13 shows reception and processing in the data processing unit 5. According to a preferred embodiment of the invention, in step 50 the data processing unit receives data from the user device in the form of series of pairs of coordinates or images, which represents an electronic version of the movement of the user device across the imaginary surface that is coded by the position-coding pattern. In step 51, received data 52 can be stored in the storage unit 6 before or in conjunction with the data being processed by the data processing unit. Identifying discontinuities in step 53 can be carried out in the same way as in the user device, that is by analysis of the distance between pairs of coordinates that were recorded close to each other in time. It is, however, also possible to identify the discontinuities on the basis of information that is provided by the user device, such as flags, etc, which indicate discontinuities that have already been identified by the user device. The analysis in step 54 of the discontinuity can be carried out completely in the user device, completely in the data processing unit or can be shared between them, so that a part of the analysis is carried out in the user device 1 and the remainder in the data processing unit 5.

The discontinuity is analyzed, among other things, with the aim of determining in step 55 whether any of the areas is associated with a function, for example sending an e-mail message or fax message. If such is the case, in step 56, this function is executed in a way known to those skilled in the art. If, on the other hand, the discontinuity is not associated with a function, it can be assumed to be an association, whereupon association data 58, as described above, is created in step 57 and is stored is a suitable storage unit 6.

Figure 14:
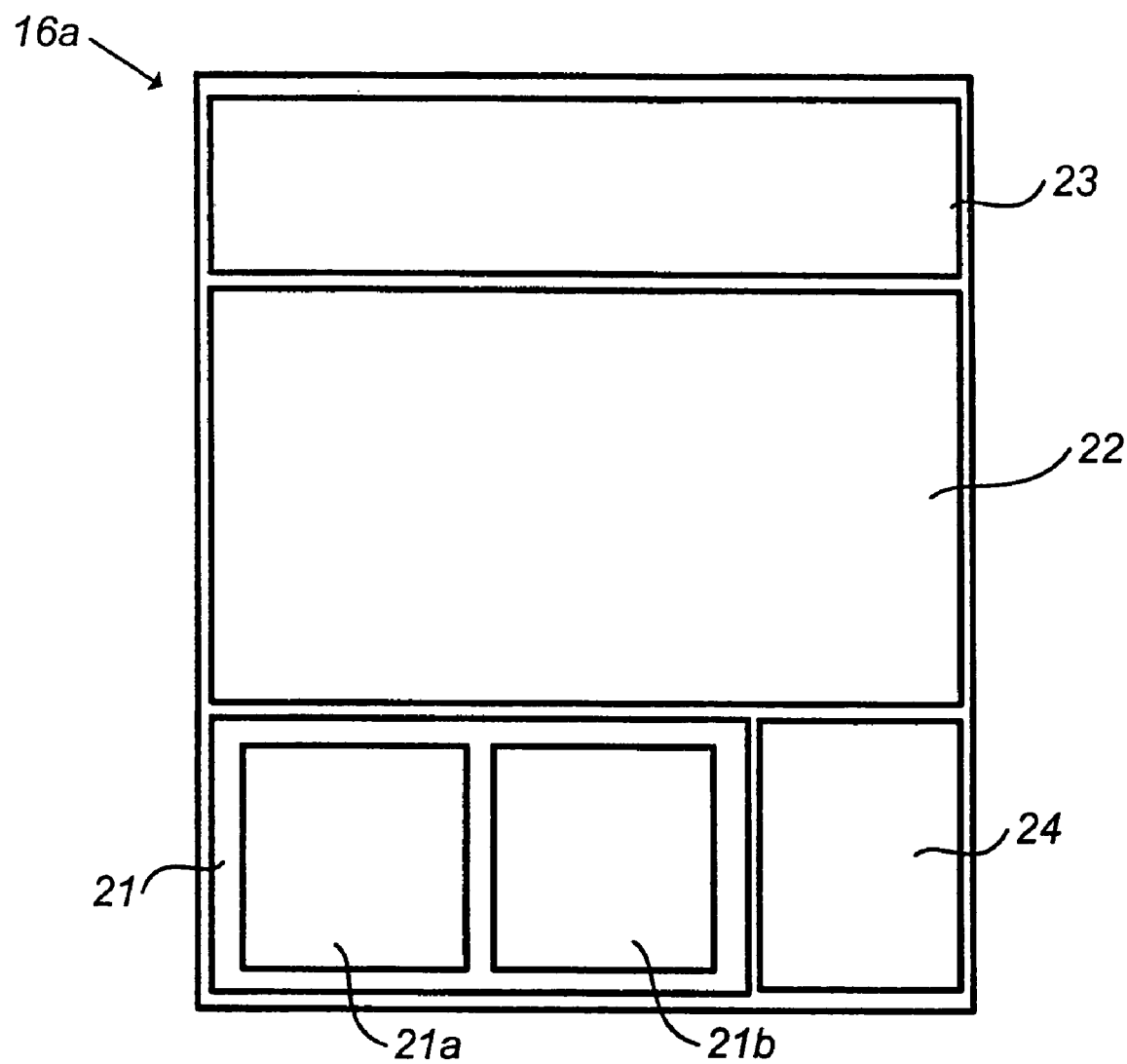
FIG. 14 shows a schematic diagram of the user device's data processing unit.

FIG. 14 shows a schematic diagram of the data processing structure of the user device 1, which data processing structure comprises a processor 16a which is arranged to receive input data, analyze it and generate output data for, for example, working memory 16b, program memory 16c, storage memory 16d (FIG. 2) or for communication with external units 5, 6 (FIG. 1). The data processing structure according to a preferred embodiment comprises input means 21 comprising means 21*a* for receiving image data and means 21*b* for receiving time data from a time-measurement means 24. The data that is received is analyzed in an analysis means 22 and is output by output means 23. The above-mentioned means 21, 22, 23, 24 can consist of customer-specific integrated circuits adapted for the purpose (for example ASIC) or of some form of programmable integrated circuit (for example PROM, FPGA) or an ordinary processor with software.

ALTERNATIVE EMBODIMENTS

It is possible only to record pairs of coordinates in the user device, which pairs of coordinates are stored in the user device's storage memory until the user device records a "send" function. When the "send" function is recorded, the pairs of coordinates in the user device's memory are sent to the data processing unit/storage unit for further processing. Alternatively, the user device may operate to continuously transmit or "stream" the recorded pairs of coordinates, or the recorded images of the positions-coding pattern, to the data processing unit/storage unit for further processing.

If the data sets that are sent to the data processing unit/storage unit are grouped according to which area of the imaginary surface they were entered on, the data processing unit will not necessarily be able to find two consecutive pairs of coordinates which belong to different coordinate areas. This can also occur if the pairs of coordinates are grouped side by side, on the basis of which base they were recorded on.

The data processing unit can then instead analyze the received coordinates and identify the lines that could constitute hyperlines. Examples of such are lines that lie at an outer edge of a coordinate area. These lines can then be analyzed in the way described above, that is with regard to the time stamps of the pairs of coordinates that form the line.

It is also possible to analyze each line individually, on the basis of the time stamp of each pair of coordinates. This can be carried out by "following", in a particular coordinate area, each line from its beginning to its end and by also analyzing, in other coordinate areas, lines that lie close in time to the start point or end point of the analyzed line.

An alternative method for identifying discontinuities is to store information in a memory regarding where the imaginary surface has been divided or "cut out", that is where the borders lie between the different areas. Using this information, lines that are recorded can be investigated to see whether they cross a predetermined border between different coordinate areas.

Yet another way of identifying discontinuities is to utilize a position-coding pattern that can code coordinate areas or subareas directly. In this way, it is possible to calculate the area affiliation of a pair of coordinates directly from the position-coding pattern. A difference in the area affiliation between two pairs of coordinates recorded directly after each other in time can thereby be an indication of a discontinuity.

Another way of storing representations of the line from which associations can be derived, is in the form of files in image or vector format, that represent the series of pairs of coordinates that were recorded by the user device 1 when lines were drawn on a base provided with a position-coding pattern. Such a file can comprise lines that are drawn over any areas from the whole of the imaginary surface, or only lines that are drawn within certain subareas, for example subareas that are associated with a specific base, such as a page of a document or the like. By the use of time data for each pair of coordinates in such a series, it is possible to scan or follow lines in such files in chronological order. By means of such a method, it is possible to find jumps on the imaginary surface between two pairs of coordinates that were recorded directly after each other. Alternatively, a series of pairs of coordinates can be analyzed in order to determine whether it comprises more than one coordinate area. Optionally, such a file in image or vector format can be used as the sole storage source for associations.

It is possible to store in a database "keys" to each recorded line, where the key indicates, for example, a start coordinate or end coordinate for each recorded line. By means of the keys, the file in image or vector format can be scanned line by line, which can save time in comparison with scanning the whole file in chronological order. Optionally, knowledge of the approximate recording time or area affiliation can be used as supplementary input data.

All the ways of storing or representing associations and lines can be used in the user device 1 or in the data processing unit/storage unit 5/6. The choice between them can be determined by factors such as processor capacity, search speed or storage capacity.

As a further alternative, associations between documents can be stored in or directly associated with those documents. An example of such storage is to provide a document, that refers to another document, with a hyperlink or the like. Such hyperlinks can be inserted where appropriate, for example directly in the text, in foot notes or in end notes/literature references.

Another alternative is to let the association govern the physical storage of associated documents, so that each document is stored in a place in the search path hierarchy, which place is determined by the documents associated with the document.

The invention can also be used on bases that have been provided with position-coding patterns, but have not yet been provided with information. As a result, "pre-determined associations" can be created, which associate areas on the imaginary surface with each other, so that the information that is later written on the base or is associated with the respective areas in some other way, will be included in the association.

The embodiments described above are to be regarded as examples of applications of the present invention. It is, of course, possible to combine the described applications or parts thereof in a plurality of ways. In addition, a very large number of other applications are possible and are covered by the appended claims.

The invention claimed is:

1. A method for associating a first coordinate area on a first surface with a second coordinate area on a second surface, said first and second coordinate areas being coded by a position-coding pattern, said method comprising:

receiving an electronic representation of a continuous line that has been drawn from either the first surface or the second surface to the other surface; and creating an association between said first and second coordinate areas based on a direction in which the line was drawn over a discontinuity in the position-coding pattern between the first surface and the second surface, a first association being created if the line was drawn in a first direction and a second association being created if the line was drawn in a second direction.

2. The method as claimed in claim 1, wherein the step of receiving an electronic representation comprises receiving a series of pairs of coordinates that represents the line and that has been determined from the position-coding pattern.

3. The method as claimed in claim 1, further comprising:
detecting the discontinuity by comparing a distance between two pairs of coordinates which were recorded during a predetermined interval of time with a predetermined distance value.

4. The method as claimed in claim 1, further comprising:
receiving in electronic form an indication of the discontinuity in the position-coding pattern.

5. The method as claimed in claim 1, wherein the step of creating an association comprises determining the direction of the line by comparing a time of recording a first pair of coordinates included in the line with a time of recording a second pair of coordinates included in the line, which pairs of coordinates lie on separate sides of the discontinuity.

6. The method as claimed in claim 1, wherein the step of receiving an electronic representation comprises receiving in electronic form an indication of the direction.

7. The method as claimed in claim 1, wherein the step of creating an association comprises creating a database entry comprising a reference to said first and second coordinate areas and an indication of the direction between them.

8. The method as claimed in claim 1, wherein which the step of receiving an electronic representation comprises receiving the electronic representation from a user device.

9. The method as claimed in claim 1, wherein the step of receiving an electronic representation comprises receiving the electronic representation from a sensor.

10. The method as claimed in claim 1, wherein said first and second coordinate areas are associated with first and second data sets respectively.

11. The method as claimed in claim 10, wherein said data sets comprise electronic documents.

12. The method as claimed in claim 10, wherein said association is a reference from one of said data sets to the other.

13. The method as claimed in claim 10, wherein the step of creating an association comprises creating a database entry that has a reference to said first and second data sets and an indication of the direction between them.

14. The method as claimed in claim 10, wherein the step of creating an association comprises modifying one of said data sets to comprise a reference to the other of said data sets.

15. The method as claimed in claim 14, wherein said reference is a hyperlink.

16. A computer program product comprising a program, tangibly embodied on a computer readable storage medium, for arranging a first and a second electronically-stored data set relative to each other wherein, when executed, the program carries out the method according to claim 1.

17. A device for associating a first coordinate area on a first surface with a second coordinate area on a second surface, said first and second coordinate areas being coded by a position-coding pattern, said device comprising:
means for receiving an electronic representation of a continuous line that has been drawn from either the first surface or the second surface to the other surface; and
means for creating an association between said first and second coordinate areas based on a direction in which the line was drawn over a discontinuity in the position-coding pattern between the first surface and the second surface, a first association being created if the line was drawn in a first direction and a second association being created if the line was drawn in a second direction.

18. The device as claimed in claim 17, further comprising:
a sensor for reading off the position-coding pattern on said first and second surfaces.

19. The device as claimed in claim 17, wherein the device is a user device which is configured for digitizing handwriting.

20. The device as claimed in claim 17, further comprising:
means for communication with a user device.

* * * * *